United States Patent Office 3,210,468
Patented Oct. 5, 1965

3,210,468
HIGH RESOLUTION OPTICAL FILM-SCANNING
APPARATUS
Timothy Trott, Oceanside, N.Y., assignor to Aeroflex
Laboratories Incorporated, a corporation of Delaware
Filed Mar. 15, 1962, Ser. No. 179,867
3 Claims. (Cl. 178—7.6)

This invention relates to optical film-scanning apparatus and, while it is of general application, it is particularly applicable for embodiment in the electro-optical film-scanning system of the type described in applicant's copending application Serial No. 107,708, filed May 4, 1961, and assigned to the same assignee as the present application.

The film-scanning system described in said copending application includes scanning apparatus which, in turn, includes a planar array of optical fibers effectively of single fiber thickness and having one end substantially rectilinear for disposition transversely to a film to be scanned and the other end being substantially arcuate. That scanning apparatus also includes a rotatable scanning means disposed to scan the arcuate end of the array and effectively comprising a single optical fiber, that is, either an actual single fiber of the same dimension as those of the array or a larger fiber or group of fibers provided with a mask having a scanning aperture substantially the size of the fibers of the array.

While the film-scanning system of aforesaid copending application is quite satisfactory for most applications, it has been found that when the film image includes detail comparable in dimensions to that of the optical fibers, the resolution leaves something to be desired.

It is an object of the present invention therefore, to provide a new and improved optical film-scanning apparatus which is capable of much higher resolution than prior apparatus of this type when scanning images having fine detail.

In accordance with the invention, an optical film-scanning apparatus comprises a substantially planar array of optical fibers of diameter $d$ and arranged in $n$ layers, the successive layers of the optical fibers being progressively laterally displaced substantially by the distance $d/n$ and one end of the array of fibers being substantially rectilinear for disposition transversely of a film to be scanned. The apparatus further comprises means for effectively illuminating a line across the film of width approximately $d$, optical means for translating an illuminated line on the film to the rectilinear end of the array of fibers with a magnification transverse to the line of approximately $n$-times, and means for scanning the other end of the array of fibers comprising effectively a transverse array of $n$ fibers. The term "diameter" is used herein and in the appended claims to mean the diameter of a cylindrical optical fiber or the equivalent maximum transverse dimension of a fiber of other shape. The expression "effectively a transverse array of $n$ fibers" is used herein and in the appended claims to refer to $n$ actual fibers in a transverse array or a larger number with a mask having an aperture equivalent to such an array. The expression "effectively illuminating a line of film of the width $d$" is used herein and in the appended claims to refer to the actual illumination of a line of such width on the film or to the illumination of a larger strip together with a mask having a slit of width $d$.

For a better understanding of the present invention, together with other and further objects thereof, reference is had to the following description taken in connection with the accompanying drawings, while its scope will be pointed out in the appended claims.

Referring to the drawings:

FIG. 2 is an explanatory chart to aid in explaining the invention; while

Figure 1:
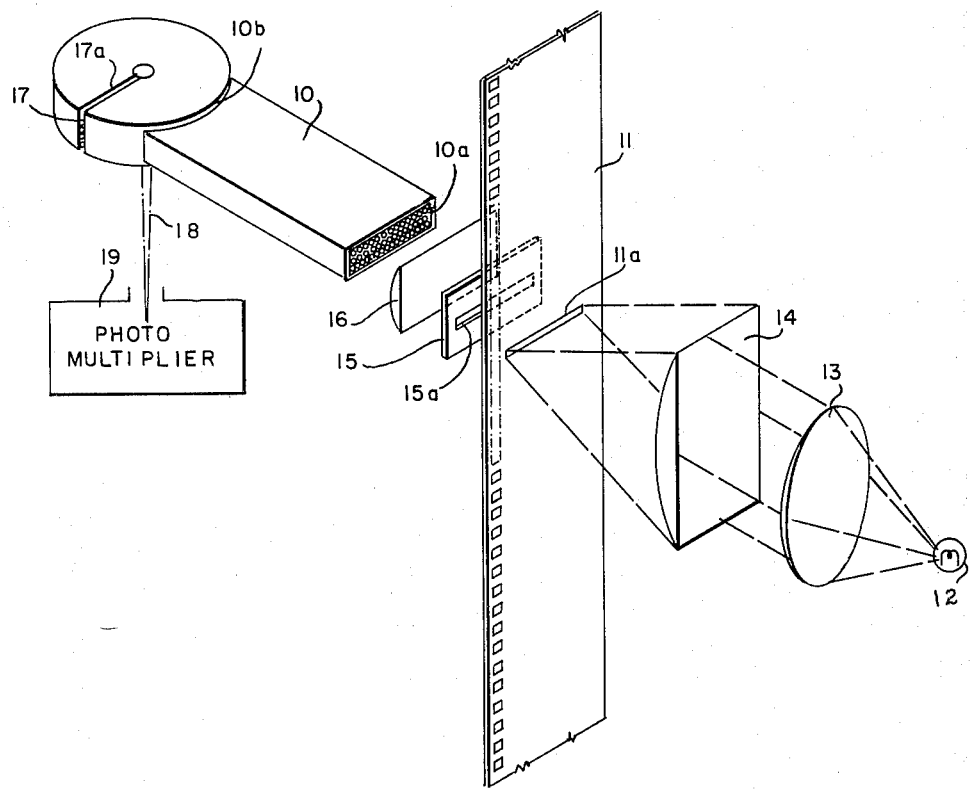
FIG. 1 is a schematic perspective representation of an optical film-scanning apparatus embodying the invention.

Referring now to FIG. 1 of the drawings, there is illustrated an optical film-scanning apparatus embodying the invention comprising a substantially planar array 10 of optical fibers each having a diameter $d$ and arranged in $n$ layers. By way of example, the fiber diameter may be $10\mu$ and the array may comprise four layers of fibers. The successive layers of fibers of the array 10 are progressively laterally displaced or indexed substantially by the distance $d/n$. The fibers of the array 10 both individually and their assembly in the array may be in accordance with the description of aforesaid copending application.

The end 10$a$ of the array 10 is substantially rectilinear, that is, normal to the longitudinal axis of the array, for disposition transversely to a film 11 to be scanned. The other end 10$b$ of the array 10 is substantially arcuate.

The film-scanning apparatus of the invention also comprises means for effectively illuminating a line across the film 11 of a width approximately equal to $d$. Specifically, a strip 11$a$ of the film 11 of width somewhat greater than $d$ is illuminated from a light source 12 by means of a spherical condensing lens 13 and a cylindrical condensing lens 14. A mask 15 having a slit 15$a$ is interposed between the film 11 and the end 10$a$ of the array 10, the slit 15$a$ registering with the illuminated strip 11$a$ and having a width equal approximately to $d$. The apparatus also comprises optical means for translating the illuminated line of such film, specifically the beam passing through the slit 15$a$, to the rectilinear end 10$a$ of the array 10 with a magnification transverse to the line of approximately $n$-times. This optical means may be in the form of a cylindrical magnifying lens 16.

The film-scanning apparatus of the invention further comprises means for scanning the arcuate end 10$b$ of the array 10, this means being in the form of a rotatable effectively vertical array 17 of $n$ fibers. The array of fibers 17, their mounting and method of rotation, may correspond to that of the rotatable scanning fibers 17$a$, 18$a$ of aforesaid copending application and include radially extending portions 17$a$ the ends of which register with the arcuate end 10$b$ of the array 10 and substantially axial portions (omitted in the drawings for the sake of clarity) for translating the optical pickup from the apparatus. The emerging beam from the scanning array 17, represented schematically at 18, is directed onto a photoelectric responsive device such as a photomultiplier 19.

Figure 2:
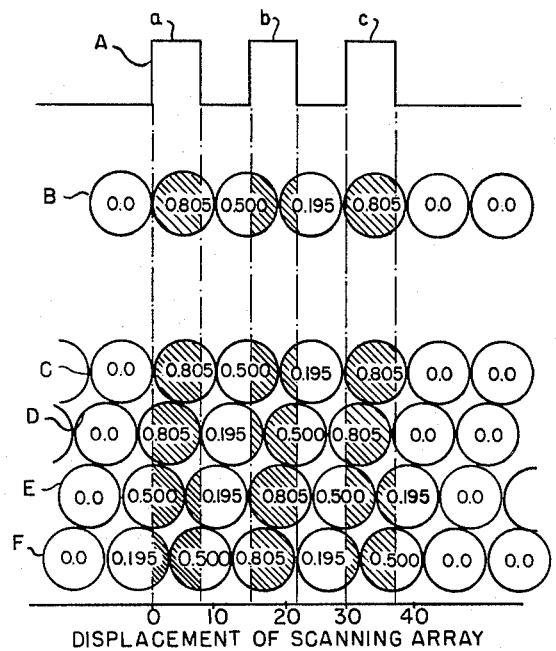

To explain the operation of the film-scanning apparatus of FIG. 1, reference is made to FIG. 2 in which curve A represents a three-line test signal or image on a line of the film 11 representing three bright dots or bars $a$, $b$, and $c$, each of a width slightly less than the diameter of the optical fiber and separated by dark areas of equal width. Beneath curve A is represented a single layer array B of scanning fibers of the type employed in aforesaid copending application, the shaded areas representing the portion of each fiber illuminated by one of the bright dots $a$, $b$, or $c$ and the numbers within each fiber representing the numerical portion of the fiber actually illuminated, which would be successively picked up by the rotating scanning fiber and converted into an electrical signal. It can be seen that the pickup from the scanning fiber will be an imperfect representation of the bright dots $a$, $b$, and $c$; that is, that a certain amount of resolution is lost.

Below the array B is shown an array consisting of four layers of optical fibers C, D, E, and F, each of the successive layers being progressively laterally displaced substantially by the distance $d/n$. For example, if $d$ is $10\mu$, as assumed above, and the number of arrays $n$ is 4, then each layer of the array 10 is laterally displaced by $2.5\mu$ relative to the contiguous layers. As in the case of array B, the portions of the areas of each fiber illuminated by one of the dots $a$, $b$, or $c$ is indicated in the shaded areas while the numbers in each fiber indicate the numerical part of the fiber that is illuminated. It can be assumed that the light flux entering the shaded area of any fiber will be uniformly distributed over the exit area of that fiber. It will be apparent that at the particular instant, for example, in which the vertical array 17 of scanning fibers registers with an exit area of the array 10 corresponding to one of the vertical shaded areas, the total pickup will be proportional to the sum of the areas of the fibers of the several layers illuminated.

The total light flux picked up by the scanning array 17 as it moves across the array consisting of layers C, D, E, and F through a distance including the entire response to the bright dots $a$, $b$, and $c$ have been computed in increments of movement of $1\mu$ each and tabulated in the following table:

| Position of scan | Flux on C | Flux on D | Flux on E | Flux on F | Total flux | Relative signal |
|---|---|---|---|---|---|---|
| −12.5 | 0 | 0 | 0 | 0 | 0 | 0 |
| −12 | 0 | 0 | 0 | .003 | .003 | .001 |
| −11 | 0 | 0 | 0 | .014 | .014 | .004 |
| −10 | 0 | 0 | 0 | .028 | .028 | .007 |
| −9 | 0 | 0 | .019 | .046 | .065 | .016 |
| −8 | 0 | 0 | .052 | .065 | .117 | .029 |
| −7 | 0 | .014 | .094 | .087 | .195 | .049 |
| −6 | 0 | .056 | .142 | .110 | .308 | .077 |
| −5 | 0 | .118 | .195 | .133 | .446 | .112 |
| −4 | .031 | .188 | .253 | .157 | .629 | .157 |
| −3 | .084 | .267 | .312 | .182 | .845 | .211 |
| −2 | .151 | .358 | .374 | .191 | 1.074 | .269 |
| −1 | .228 | .452 | .437 | .192 | 1.309 | .327 |
| 0 | .314 | .548 | .500 | .206 | 1.568 | .392 |
| 1 | .406 | .650 | .444 | .227 | 1.727 | .432 |
| 2 | .503 | .754 | .394 | .253 | 1.904 | .476 |
| 3 | .602 | .757 | .349 | .288 | 1.996 | .499 |
| 4 | .703 | .664 | .308 | .327 | 2.002 | .501 |
| 5 | .805 | .576 | .271 | .369 | 2.021 | .505 |
| 6 | .722 | .498 | .241 | .418 | 1.879 | .470 |
| 7 | .654 | .423 | .216 | .471 | 1.764 | .441 |
| 8 | .597 | .354 | .198 | .482 | 1.631 | .408 |
| 9 | .548 | .298 | .189 | .460 | 1.495 | .374 |
| 10 | .509 | .251 | .195 | .459 | 1.414 | .354 |
| 11 | .481 | .213 | .201 | .469 | 1.364 | .341 |
| 12 | .463 | .196 | .230 | .490 | 1.379 | .345 |
| 13 | .458 | .191 | .273 | .524 | 1.446 | .361 |
| 14 | .468 | .192 | .327 | .569 | 1.556 | .389 |
| 15 | .500 | .206 | .390 | .621 | 1.717 | .429 |
| 16 | .444 | .227 | .461 | .685 | 1.817 | .454 |
| 17 | .394 | .253 | .540 | .763 | 1.950 | .488 |
| 18 | .349 | .288 | .622 | .757 | 2.016 | .504 |
| 19 | .308 | .327 | .710 | .664 | 2.009 | .502 |
| 20 | .271 | .369 | .805 | .576 | 2.021 | .505 |
| 21 | .241 | .418 | .722 | .498 | 1.879 | .470 |
| 22 | .216 | .471 | .654 | .423 | 1.764 | .441 |
| 23 | .198 | .482 | .597 | .354 | 1.631 | .408 |
| 24 | .189 | .460 | .548 | .298 | 1.495 | .374 |
| 25 | .195 | .459 | .509 | .251 | 1.414 | .354 |
| 26 | .201 | .469 | .481 | .213 | 1.364 | .341 |
| 27 | .230 | .490 | .463 | .196 | 1.379 | .345 |
| 28 | .273 | .524 | .458 | .191 | 1.446 | .361 |
| 29 | .327 | .569 | .468 | .192 | 1.556 | .389 |
| 30 | .390 | .621 | .500 | .206 | 1.717 | .429 |
| 31 | .461 | .685 | .444 | .227 | 1.817 | .454 |
| 32 | .540 | .763 | .394 | .253 | 1.950 | .488 |
| 33 | .622 | .754 | .349 | .288 | 2.013 | .503 |
| 34 | .710 | .650 | .308 | .327 | 1.995 | .499 |
| 35 | .805 | .548 | .271 | .369 | 1.993 | .498 |
| 36 | .703 | .452 | .241 | .418 | 1.814 | .453 |
| 37 | .602 | .358 | .216 | .471 | 1.647 | .412 |
| 38 | .503 | .267 | .198 | .468 | 1.436 | .359 |
| 39 | .406 | .188 | .189 | .404 | 1.187 | .297 |
| 40 | .314 | .118 | .195 | .341 | .968 | .242 |
| 41 | .228 | .056 | .170 | .281 | .735 | .184 |
| 42 | .151 | .014 | .146 | .223 | .534 | .134 |
| 43 | .084 | 0 | .122 | .166 | .372 | .093 |
| 44 | .031 | 0 | .099 | .117 | .247 | .062 |
| 45 | 0 | 0 | .076 | .073 | .149 | .037 |

The foregoing table indicates the position of the center of the scanning array 17 relative to the four layers C, D, E, and F of FIG. 2 and, for each position, gives the numerical value of the light flux on the illuminated fibers of each layer, the total light flux picked up by the scanning array from the four layers, and the relative signal in terms of what would be picked up by an ideal scanning arrangement with perfect resolution.

Figure 3:
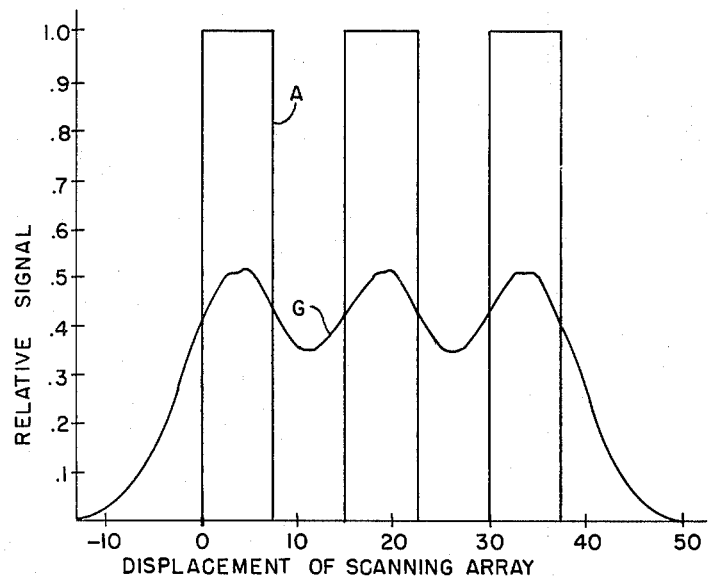
FIG. 3 represents the relative input and output signals of a film-scanning apparatus embodying the invention for a test input signal representative of fine detail.

Referring now to FIG. 3, there is shown in curve G the value of the signal output in terms of the input or test signal of curve A which, it is assumed, has a unit value. While curve G indicates that there is some degradation of curve A due to loss of resolution, the three test impulses of curve A are clearly identifiable and accurately spaced.

For simplicity of illustration, the invention has been described as an array 10 comprising four laterally indexed or displaced layers and a corresponding array 17 of four scanning fibers. Obviously, substantial improvement in resolution and in accuracy of reproduction of the test signal of curve A can be achieved by increasing the number of layers in the array 10 and the scanning array 17, the number of layers used being a matter of economics in accordance with the system to which the scanning apparatus is to be applied.

While there has been described what is, at present, considered to be the preferred embodiment of the invention, it will be obvious to those skilled in the art that various changes and modifications may be made therein without departing from the invention and it is, therefore, aimed in the appended claims to cover all such changes and modifications as fall within the true spirit and scope of the invention.

What is claimed is:
1. An optical film-scanning apparatus comprising:
   (a) a substantially planar array of optical fibers of diameter $d$ and arranged in $n$ layers;
   (b) the successive layers of said fibers being progressively laterally displaced substantially by the distance $d/n$;
   (c) one end of said array being substantially rectilinear for disposition across a film to be scanned;
   (d) means for effectively illuminating a line across said film of width approximately $d$;
   (e) optical means for translating an illuminated line on said film to said rectilinear end of said array with a magnification transverse to said line of approximately $n$-times;
   (f) and means for scanning the other end of said array comprising effectively a vertical array of $n$ fibers.

2. An optical film-scanning apparatus comprising:
   (a) a substantially planar array of optical fibers of diameter $d$ and arranged in $n$ layers;
   (b) the successive layers of said fibers being progressively laterally displaced substantially by the distance $d/n$;
   (c) one end of said array being substantially rectilinear for disposition across a film to be scanned;
   (d) means for effectively illuminating a strip across said film;
   (e) a transverse mask having a slit registering with said strip and of width approximately $d$;
   (f) optical means for translating the beam passing through said slit to said rectilinear end of said array with a magnification transverse to said line of approximately $n$-times;
   (g) and means for scanning the other end of said array comprising effectively a vertical array of $n$ fibers.

3. An optical film-scanning apparatus comprising:
   (a) a substantially planar array of optical fibers of diameter $d$ and arranged in $n$ layers;
   (b) the successive layers of said fibers being progressively laterally displaced substantially by the distance $d/n$;
   (c) one end of said array being substantially rectilinear for disposition across a film to be scanned and the other end thereof being substantially arcuate;

(d) means for effectively illuminating a line across said film of width approximately $d$;

(e) optical means for translating an illuminated line on said film to said rectilinear end of said array with a magnification transverse to said line of approximately $n$-times;

(f) and means for scanning the other end of said array comprising effectively a rotatable vertical array of $n$ fibers including radially extending portions registering with the arcuate end of said array and substantially axial portions for translating the optical pickup from the apparatus.

References Cited by the Examiner

UNITED STATES PATENTS

| | | | |
|---|---|---|---|
| 2,939,362 | 6/60 | Cole | 178—6 |
| 3,036,153 | 5/62 | Day | 178—6 |

OTHER REFERENCES

Optica Acta, vol. 1, No. 4, February 1955, pp. 164–170; "Transparent Fibres for the Transmission of Optical Images," Hopkins et al.

DAVID G. REDINBAUGH, *Primary Examiner.*

ROY LAKE, *Examiner.*